C. E. GIERDING.
TROLLEY CATCHER AND RETRIEVER.
APPLICATION FILED JAN. 11, 1915.

1,193,890.

Patented Aug. 8, 1916.
4 SHEETS—SHEET 1.

Attest:

Inventor:
Charles E. Gierding
by
Atty

C. E. GIERDING.
TROLLEY CATCHER AND RETRIEVER.
APPLICATION FILED JAN. 11, 1915.

1,193,890.

Patented Aug. 8, 1916.
4 SHEETS—SHEET 2.

UNITED STATES PATENT OFFICE.

CHARLES E. GIERDING, OF NEW HAVEN, CONNECTICUT.

TROLLEY CATCHER AND RETRIEVER.

1,193,890.   Specification of Letters Patent.   Patented Aug. 8, 1916.

Application filed January 11, 1915. Serial No. 1,584.

*To all whom it may concern:*

Be it known that I, CHARLES E. GIERDING, a citizen of the United States, residing at New Haven, in the county of New Haven and State of Connecticut, have invented certain new and useful Improvements in Trolley Catchers and Retrievers, of which the following is a specification, reference being had therein to the accompanying drawings.

My invention relates to a new and improved trolley catcher and retriever, having for its object, among other things, to provide a device of this character that will be simple in construction, positive in its operation, adjustable as far as possible in its parts, and may be constructed and sold at the minimum cost.

To these, and other ends, my invention consists in the trolley catcher and retriever, having certain details of construction and combinations of parts, as will be hereinafter described and more particularly pointed out in the claims.

Referring to the drawings, in which like numerals of reference designate like parts in the several figures.

In the drawings, the numeral 1 designates the body member of my device, upon one side of which is secured the reel case 2, and upon the other side is secured the spring case 3. Within this latter case is the retriever spring 4, having a lip 5 that projects into a slot 6 in the case to anchor the outer end of the spring. To the inner end of the retriever spring is fixed the plate 36 that lies against the face of the core 7, having a longitudinal tooth 35 in the periphery thereof and rotatably mounted upon a post 85 in the spring case 3.

If the trolley rope should break and the retriever spring run down, the momentum of the mechanism connected therewith would cause the spring core 7 to rotate, without imparting either a winding or unwinding movement to said spring, the tooth thereon passing over the plate 36. The rotation of the core 7 in the opposite direction, moves the tooth 35 into engagement with the inner edge of the plate 36, which thereby forms a stop shoulder and thus provides an operative engagement between the core and spring, whereby the same is wound up.

The retriever disk 8 is provided upon one side with a stud 9 that in part is angular in cross section and projects into the spring core 7, and upon the opposite side thereof is the stud 10 that is journaled within the spring collar 11, which in turn is rotatably mounted within the reel case 2. Connected with one side of said disk and projecting laterally therefrom are the studs 12, upon which are pivotally mounted the holding dogs 13. These dogs are supported at their rear ends by the lugs 14 also integral with said disk and designed to relieve the shock upon the studs 12, as the holding dogs are brought into contact with the stops 15 upon the inside of the reel 16. A link 17 connects these holding dogs 13 so that the movement of one is transmitted to the other, and the same are normally held in their inward position by a spring 18 encircling one of the posts 12. This is only one convenient means of connecting a spring with these parts, as any one of many other forms may be used equally as well. Heretofore the dogs in a device of this character having the function of my holding dogs have only been supported by the posts upon which they have been pivotally mounted, but the shock upon the dogs transmitted to said posts upon occasion, is so great as to frequently break off the same, thus injuring and destroying the mechanism. With my device the posts 12 perform a function the same as is common in the art and the lugs 14 take the shock previously borne entirely by the posts. It is therefore practically impossible in the operation of this device to knock off either the posts 12 or the lugs 14.

Pivotally mounted upon a post 19 on the retriever disk 8, is a dog lever 20, the outer end of which projects over the edge of said disk and the opposite end of which engages the finger 68 upon one of the holding dogs 13. The connection between these parts is such that movement of the dog lever 20 in one direction prevents the holding dogs 13 from moving into such a position that the nose of each of said dogs is out of the path of the stops 15.

Figure 4:
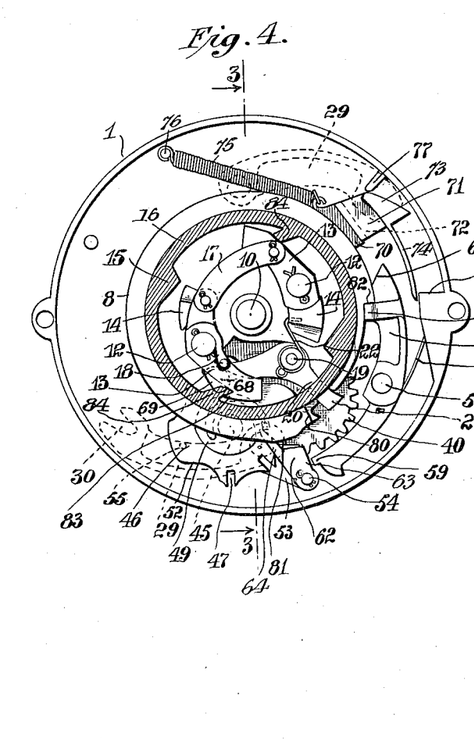
Fig. 4 is a view of the interior of the device with the reel case and reel removed therefrom and the parts in section, taken upon line 4—4 of Fig. 3.

A spring 22 connected with said dog lever and one of the lugs 14, or other fixed part, exerts its tension so as to always tend to maintain the said dog lever in the position substantially as shown in Fig. 4, wherein the holding dogs 13 are in such position that the nose end of each holding dog is in the path of the stops 15.

The reel 16 is provided with flanges 23 between which the trolley rope 24 is coiled. Within the reel is a slack take-up spring 25, which is secured to the reel at its outer end and to the spring collar 11 at its inner end. This spring collar is held against rotation by a cotter pin 27 in the stud 10 which projects into the radial slots 26 in said collar. This operative connection between the collar 11 and stud 10 is such that the retriever disk 8 and collar 11 are at rest and in motion at the same time. The function of the spring 25 is to hold the trolley rope 24 taut, and to take up the slack therein due to the variation in the horizontal levels of the trolley wire against which the trolley runs, the spring 25 always exerting a slight winding tension upon the reel 16 to produce this result.

Projecting laterally from one of the reel flanges 23 are the posts 28, upon which are pivotally mounted the throwout dogs 29, each of which is provided with a notch 30 in its outer end for a purpose hereafter to be described. These throwout dogs are held against lateral movement in relation to the said flange by the lugs 31, which are integral with the reel and project over the flange 32 on said dogs. Heretofore it has been the practice in some retrievers to hold these throwout dogs against lateral movement by riveting the heads of the posts 28, or by equally cumbersome expedients that require attachment to the posts. When the dog is secured in this manner a broken dog cannot be readily replaced, as the reel is usually destroyed in taking off the dog. In practice, if a throwout dog is broken, it has been customary and generally necessary to install an entirely new reel. With my mechanism, if the throwout dog should break, a new one can be substituted with little or no inconvenience.

Figures 5, 6, 9:
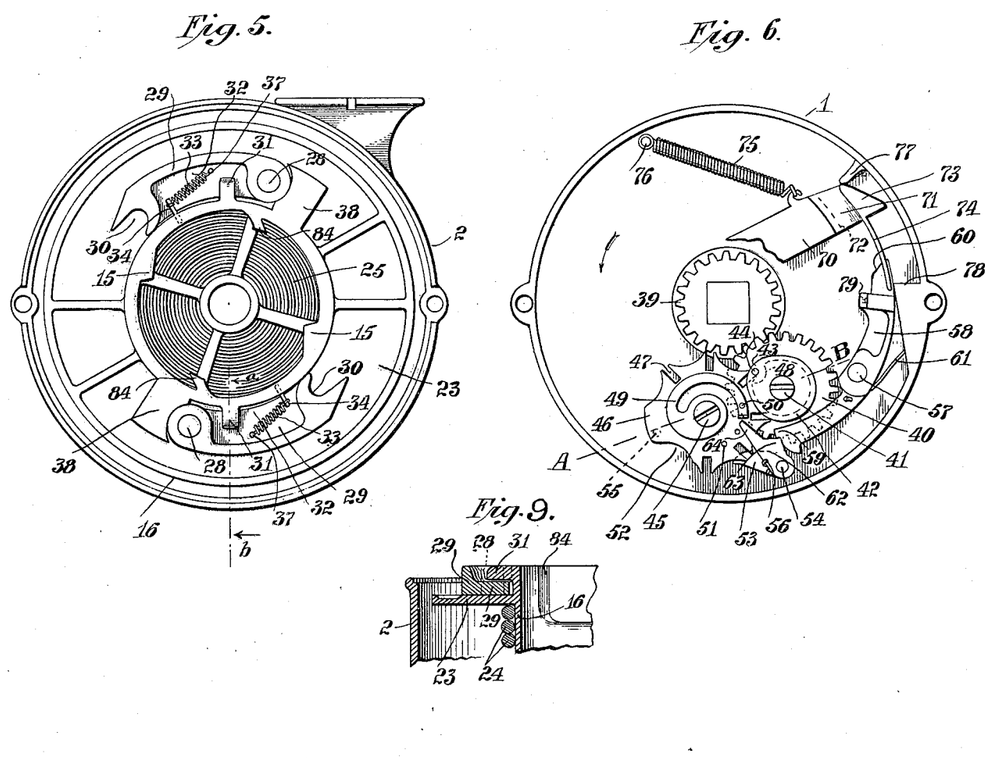
Fig. 5 is a view of the rear face of the reel case, showing the throwout dogs in their innermost position.
Fig. 6 is a view of the body portion of the device, showing in detail the retriever spring mechanism.
Fig. 9 is a sectional view of a portion of the reel and adjacent parts, taken upon line *a—b* of Fig. 5.

The springs 33 extending between the pins 34 in the reel, and the pins 37 in the throwout dogs, draw the said dogs into their innermost position, being substantially that shown in Fig. 5.

Integral with the flange, adjacent to the post 28 are the backing lugs 38 that provide a support for the rear end of the throwout dogs 29, thereby relieving the post 28 from the shock transmitted thereto by the engagement of the throwout dogs. The function of the backing lugs 38 is substantially the same as the lugs 14.

Rotatably mounted within the body member 1, and mounted upon the stud 9 is the pinion 39, the teeth of which mesh into those of a pinion 40 pivotally mounted upon a stud 41 in the body member 1. Connected with one face of the pinion 40 are the disks 43 and 42, the latter overhanging the former and having a pin 44 fixed therein. The disks 42 and 43 are shown and described herein as being separate elements, but they may be made integral with each other if desired.

Rotatable upon a stud 45 fixed in the body member 1, is Geneva wheel 46, the notches 47 in the edge thereof being movable in the path of the pin 44, so that by the rotation of the pinion 40 the pin 44 engages one of said notches and imparts movement to said Geneva wheel, a recess 48 in the disk 43 accommodating this movement. Upon one side of the Geneva wheel is a trip plate 49 having a pin 50 therein, which projects into any one of a plurality of holes 51 in said Geneva wheel and thereby held against relative movement thereon. The position of the trip plate 49 upon the Geneva wheel 46 is varied by shifting it about the axis of said wheel and replacing the pin 50 in another one of the holes 51.

The pinion 39 is rotated in the direction of the arrow in Fig. 6 by the unwinding of the retriever spring 4, and in the opposite direction manually when the retriever spring is being wound.

When the periphery of the disk 42 lies within the circular portion 52 of the Geneva wheel, no motion is imparted to said wheel, and a pawl 53 upon the fixed stud 54, actuated by a spring 56 engages the pin 55 in said Geneva wheel to hold these parts in the relative position just described.

Upon the post 57 connected with the body member 1 the retriever dog 58 is rotatably mounted, one end terminating in a lip 59 and the other end in a cam face 60. A spring 61 connected with said retriever dog exerts its tension so as to throw the cam end thereof into its innermost position. Also mounted upon the post 54 is the trip dog 62, the arm 63 of which, in one of its positions, is engaged by the lip 59, and the arm 64 thereon is engaged by the trip plate 49.

The spring 56 that surrounds the post 54 engages both the pawl 53 and the trip dog 62, having thereby a tendency to move these parts in opposite directions. The lower end of the spring 56 is bent at right angles to its length and this bent portion projects into a hole 86 in the pawl 53 to prevent said spring from rotating about its axis.

A cam 66 is journaled upon the stud 9 and has a cam notch 67 in its periphery, against which lies the finger 68 on one of the holding dogs 13 that projects through an opening 69 in the disk 8. When the holding dogs 13 are in their innermost position the finger 68 lies within the notch 67 in said cam, but when the cam is rotated the finger 68 is moved out of said notch onto the periphery of the cam, and the holding dogs 13 are thereby moved into their outward position being there held positively by reason of the contact of the finger with the cam. Connected with the cam 66, and preferably integral therewith is a lever arm 70 having an offset portion 71 thereon terminating in a stop lug 73 and a shield 74. Between the arm 70 and offset portion 71 is the cam shoulder 72. A spring 75 connected to the lever arm 70 and a fixed post 76 exerts its tension so as to hold said lever arm with the stop lug 73 against the stop 77 integral with the body member 1. When in this position (Figs. 4 and 6), the shield 74 is in contact with the lug 78 so that it is impossible for any moving parts to enter the space between the lugs 77 and 78.

With the retriever spring wound up the lever arm is in its retracted position, the stop 79 upon the retriever dog 58 is in contact with the dog lever 20, which in turn is against the shoulder 80 in the rim of the retriever disk 8, the holding dogs are in their innermost position out of the path of the stops 15 so that the reel 16 rotates about the stud 10 independently of the retriever spring mechanism, and the slack take-up spring 25 is free to actuate said reel to hold the trolley cord taut.

Assuming now that the trolley jumps the wire, the pole immediately flies upwardly and the quick rotation of the reel 16 moves the throwout dogs 29 against the tension of the springs 33 to their outermost position, in which position the notch 30 in one of said dogs engages the stop lug 73 on the lever 70 and moves the same against the tension of the spring 75 until said lug engages the stop lug 78. During the final portion of this movement the shoulder 72 upon the arm 70 engages the cam face 60 on the locking dog 58 and rocks the dog upon its pivot mounting so as to permit the spring 56 to actuate the trip dog 62 and engage the arm 63 thereon with the lip 59 by moving said trip dog about its axis so that the arm 64 thereon moves toward the post 57. At the same time the stop 79 is moved out of the path of the dog lever 20, which is thereby released, as is also the retriever disk 8, which is then rotated by the retriever spring 4. Just prior to the engagement of the shoulder 72 with the cam face 60, the finger 68 upon one of the holding dogs 13 rides out of the notch 67 and throws the said dogs to their outward position so that they are in the path of the lugs 15 within the reel 16 before the retriever mechanism begins to operate. So far as at present advised, it is new to operate the holding dogs before the retriever mechanism exerts its influence. Heretofore this action has been simultaneous with that of the retriever mechanism, a motion and movement that is not always positive and certain in its action. The retriever spring 4, through its actuation of the stud 9 and disk 8, now winds the reel 16, and thus coils the trolley rope and draws the trolley pole below the wire. This motion continues until there has been a predetermined unwinding of the retriever spring or said spring is neutralized by the pressure of the trolley pole spring. During the unwinding of the retriever spring, motion is imparted to the Geneva wheel as before described, through the pinions 39 and 40. If, however, the rope should break during the unwinding of the retriever spring the reel continues to rotate until the periphery of the disk 43 is brought into contact with the circular portion 52 of the Geneva wheel, as before described, at which time if there is any momentum left in the mechanism, it is exhausted by rotation of the core 7 within the retriever spring without imparting any motion to said retriever spring. In practice a winding of five revolutions of the retriever spring is the ordinary maximum, and if I desire to limit my unwinding to any predetermined number of revolutions, this is accommodated through the notches 47 in the Geneva wheel, which is so placed in relation to the pin 44 that it will only engage as many notches as there are unwinding revolutions desired, this adjustment taking place when the mechanism is first assembled.

Figure 7:
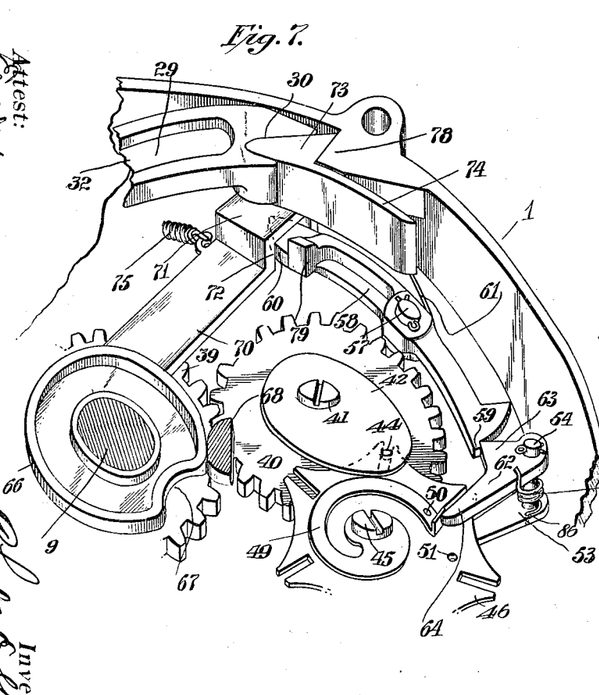
Fig. 7 is a fragmentary perspective view of a portion of the retriever spring mechanism.
Figures 8, 11:
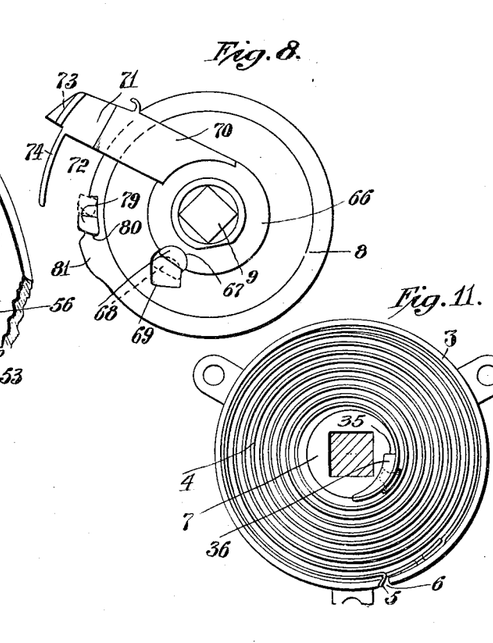
Fig. 8 is an underside view of the retriever disk and some of the parts adjacent thereto.
Fig. 11 is a detail view of the retriever spring case and the mechanism connected therewith, the part in section being taken upon line A—B of Fig. 3.
Figure 10:
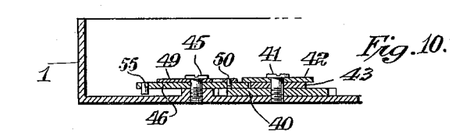
Fig. 10 is a sectional view of a portion of the Geneva wheel mechanism, taken upon line A—B of Fig. 6.

Upon the disk 8 is a cam 81, which is designed to insure the engagement of the arm 63 of the trip dog 62 with the lip 59 by giving the locking dog 58 an additional rocking movement over and above that imparted thereto through the lever 70. This latter action is only designed as a matter of abundant precaution, because the lever 70 rocks the locking dog sufficiently to permit the trip dog 62 to engage therewith, as shown in Fig. 7, but a slight additional rocking movement, imparted through the cam 81, insures beyond all question, the proper engagement of these parts.

Figure 1:
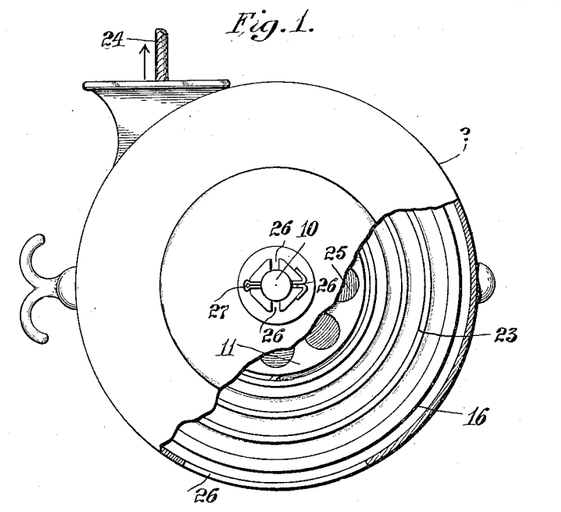
Figure 1 is a fragmentary end elevation of my improved device.
Figure 2:
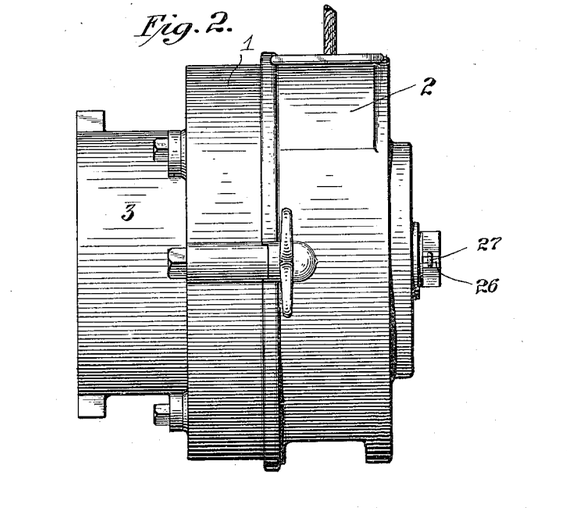
Fig. 2 is a side view thereof complete.
Figure 3:
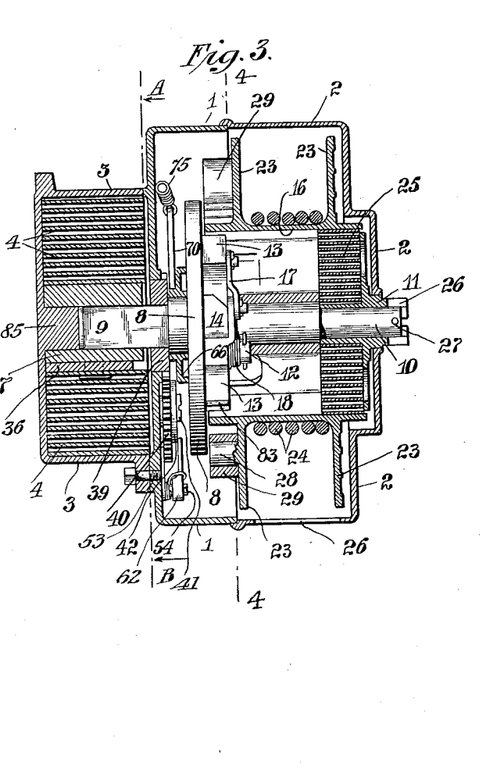
Fig. 3 is a sectional view of the device, taken upon line 3—3 of Fig. 4.

To wind the retriever spring 4 after it has run down, the operator grasps the trolley rope 24 and pulls it in the direction of the arrow, shown in Fig. 1, and through the engagement of the holding dogs 13 with the lugs 15, rotary movement is imparted to the retriever disk 8 which is transmitted to the spring through the stud 9 and core 7. During this movement the pin 44 rotates the Geneva wheel 46 clockwise as seen in Figs. 4 and 6 and brings the trip plate 49 into contact with the end of the arm 64 of the trip dog 62 and moves the same upon its pivot mounting so as to free the arm 63 from its engagement with the lip 59, when the spring 61 throws the locking dog 58 inwardly and the lug 79 thereon contacts with the periphery of the retriever disk 8 and there remains until it registers with the notch 82 in the periphery of the said disk, when it drops therein and prevents further winding movement and the parts all come to a full stop. At this point the operator releases the rope and the tension of the retriever spring is then applied to the retriever disk which is rotated in the reverse direction until the dog lever 20 is brought into contact with the stop lug 79 and the shoulder 80. At this time the dog lever 20 is moved so that the holding dogs 13 are controlled by the spring 18 and are moved into their innermost position out of the path of the stops 15 within the reel, which can then run free subject to the influence of the take up spring 25.

There is no fixed engagement between the dog lever 20 and the holding dogs 13 so that when the dog lever 20 is moved upon its pivot mounting, the spring 18 controls the movement of the holding dogs 13 and moves them inwardly out of the path of the lugs 15, at which time the slack take-up spring 25 actuates the reel and maintains the trolley rope taut.

Immediately the reel 16 is freed from the retriever mechanism the throwout dogs 29 and arm lever 70 are returned to their original positions by the action of the springs 75 and 33. The holes 51 are so arranged in the Geneva wheel 56 that the trip plate 49 is caused to actuate the trip dog 62 at a predetermined number of winding revolutions. As the retriever springs are normally made so as to provide for five winding revolutions, my mechanism is designed to accommodate such springs, but any predetermined number of revolutions can be provided for, be they more or less.

One of the holding dogs 13 is provided with a tooth 83 that is designed to be moved into the path of the lugs 84 by the backward movement of the reel and thereby prevent any premature unwinding of the slack take-up spring 25. For convenience both the tooth 83 and the lug 84 are undercut so as to insure their engagement with each other and retain such engagement when once made.

Attention is particularly invited to the fact that it is impossible to completely unwind the slack take-up spring 25 during the retrieving operation, as both the reel with which one end of the same is connected, and the stud 10, with which the other end is connected, are substantially a unitary structure, both rotating together during the winding and unwinding of the retriever spring.

There are minor changes and alterations that can be made within my invention, aside from those herein suggested, and I would therefore have it understood that I do not limit myself to the exact construction herein shown and described, but claim all that falls fairly within the spirit and scope of my invention.

Having described my invention, what I claim as new and desire to secure by Letters Patent, is:—

1. In a combined trolley catcher and retriever, having holding dogs for forming an operative engagement therebetween; of cam means for positively moving said dogs into their holding position prior to the operation of the retrieving mechanism.

2. In a device of the character described, the combination with a reel; of dogs pivotally connected therewith; and means for preventing a lateral movement of said dogs, said means comprising a member integral with said reel and projecting across one side of said dogs at a point beyond its pivot mounting.

3. In a combined trolley catcher and retriever, the combination with a casing; of a member rotatably mounted therein; a reel mounted upon said member; a spring for moving said member in one direction; means for separately connecting said reel with said member, whereby the same will move as a unit; means for actuating said means whereby the same will have an operative engagement with said reel prior to the time said spring exerts its influence to rotate said member; and means for predetermining the number of unwinding revolutions of said latter spring.

4. In a combined trolley catcher and retriever, the combination with a reel; of a rotary member; a retriever spring for rotating the same in one direction; holding dogs for forming an operative engagement between said reel and rotary member; one of said dogs having a tooth thereon in the path of a lug on said reel to prevent a premature reverse movement of the reel while said dogs are in their outward position.

5. In a device of the character described, the combination with a reel having a lug thereon with a part substantially parallel with that portion of the reel with which it is connected; of a dog pivotally connected therewith and moving between the parallel portion of said lug and reel.

6. In a device of the character described, the combination with a rotary member having one or more posts thereon and lugs adjacent thereto, one face of said lugs being substantially concentric with the axis of the adjacent post; of dogs or pawls pivotally mounted upon said posts and having engagement with said lugs and supported thereby so as to relieve the shock upon said post.

7. In a device of the character described, the combination with a member having a post connected therewith and a lug adjacent thereto; of a dog or pawl mounted upon said post and having engagement at one end with said lug.

8. In a device of the character described, the combination with a member having an overhanging lug thereon, post, and a second lug adjacent to said post; of a dog or pawl mounted upon said post and lying between said member and said overhanging lug with one end thereof having a movable engagement with said second lug.

9. In a combined trolley catcher and retriever, the combination with a casing; of a member rotatably mounted therein; a reel journaled upon said member; a slack take-up spring for rotating said reel in one direction; a retriever spring for rotating said rotary member; a Geneva wheel; and an operative connection between said rotary member and Geneva wheel comprising a gear connected with said rotary member, a gear having engagement therewith, and a pin fixed in said latter gear.

10. In a trolley catcher and retriever, the combination with a casing; of a shaft rotatably mounted therein; a reel arranged to normally rotate loosely upon said shaft; a slack take-up spring between said reel and shaft; a retriever spring connected with said shaft for actuating the same in one direction; a pivotally mounted lever connected with a fixed part and normally engaging said shaft to prevent the rotation thereof by said retriever spring; a second lever movable in the path of the aforesaid lever and a centrifugally actuated dog operated by the motion of said reel for releasing said shaft holding means through the action of said second lever.

11. In a trolley catcher and retriever, the combination with a casing; of a shaft rotatably mounted therein; a reel arranged to rotate loosely upon said shaft; a disk loosely mounted upon said shaft having an arm extending radially therefrom; a member connected with a fixed part for holding said shaft against rotation; a retriever spring having connection with said shaft for rotating the same in one direction; and a centrifugally actuated dog operated by the motion of said reel and arranged to engage the arm upon said disk and move the same in the path of said holding means whereby said shaft is released.

12. In a trolley catcher and retriever, the combination with a casing; of a shaft rotatably mounted therein; a reel arranged to rotate loosely upon said shaft; a slack take-up spring between said reel and shaft; a retriever spring having operative engagement with said shaft and arranged to rotate the same in one direction; means for holding said shaft against movement by said retriever spring, means, set in motion from said reel, for releasing said holding mechanism; and means for limiting the number of rotations of said shaft under the influence of said retriever spring, said means being controlled by adjustable mechanism set in motion through the rotation of said shaft.

13. In a trolley catcher and retriever, the combination with a casing; of a shaft rotatably mounted therein; a reel arranged to rotate loosely upon said shaft; a slack take-up spring between said reel and shaft; a retriever spring having operative engagement with said shaft and arranged to rotate the same in one direction; means for holding said shaft against movement by said retriever spring; means, set in motion from said reel, for releasing said holding mechanism; means for limiting the number of rotations of said shaft under the influence of said retriever spring, said means being controlled by adjustable mechanism, set in motion through the rotation of said shaft, and comprising a rotary member; an operative connection between said rotary member and said shaft; and a trip member.

14. In a trolley catcher and retriever, the combination with a casing; of a shaft rotatably mounted therein; a reel arranged to rotate loosely upon said shaft; a slack take-up spring between said reel and shaft; a retriever spring having operative engagement with said shaft and arranged to rotate the same in one direction; means for holding said shaft against movement by said retriever spring; means, set in motion from said reel, for releasing said holding mechanism; means for limiting the number of rotations of said shaft under the influence of said retriever spring, said means being controlled by adjustable mechanism, set in motion through the rotation of said shaft, and comprising a rotary member; an operative connection between said rotary member and said shaft; a trip member; and means for adjustably connecting said trip member with said rotary member.

15. In a trolley catcher and retriever, the combination with a casing; of a shaft rotatably mounted therein; a reel arranged to rotate loosely upon said shaft; a slack take-up spring between said reel and shaft; a retriever spring having operative engagement with said shaft and arranged to rotate the same in one direction; means for holding said shaft against movement by said retriever spring; means, set in motion from said reel, for releasing said holding mechanism; means for limiting the number of rotations of said shaft under the influence of said retriever spring, said means being controlled by adjustable mechanism, set in motion through the rotation of said shaft, and comprising a rotary member; a geared connection between said rotary member and said shaft; and a trip member connected with said rotary member and adjustable about the axis thereof.

16. In a trolley catcher and retriever, the combination with a casing; of a shaft rotatably mounted therein; a reel arranged to rotate loosely upon said shaft; a slack take-up spring between said reel and shaft; a retriever spring having operative engagement with said shaft and arranged to rotate the same in one direction; means for holding said shaft against movement by said retriever spring; means, set in motion from said reel, for releasing said holding mechanism; means for limiting the number of rotations of said shaft under the influence of said retriever spring, said means being controlled by adjustable mechanism, set in motion through the rotation of said shaft and comprising a Geneva wheel; a geared connection between said Geneva wheel and shaft; and a trip plate adjustably connected with said Geneva wheel.

17. In a trolley catcher and retriever, the combination with a casing; of a shaft rotatably mounted therein; a reel arranged to normally rotate upon said shaft; a slack take-up spring between said reel and shaft; a retriever spring connected with said shaft for actuating the same in one direction; means connected with a fixed part and normally engaging said shaft to lock the same against rotation by said retriever spring; means for limiting the number of rotations of said shaft under the influence of said retriever spring, said means comprising a rotary member; an operative connection between said rotary member and said shaft; a trip member; and a locking member interposed between said trip member and shaft locking means.

18. In a combined trolley catcher and retriever, the combination with a casing; of a member rotatably mounted therein; a reel journaled upon said member; a slack take-up spring for rotating said reel in one direction; a retriever spring for rotating said rotary member; means connected with a fixed part having engagement with said shaft for locking the same against rotation by said retriever spring; means for moving said locking means out of engagement with said shaft; and a pivotally mounted trip member engaging said locking means and holding it against movement when the same is disengaged from said shaft.

19. In a combined trolley catcher and retriever, the combination with a casing; of a shaft rotatably mounted therein; a reel journaled upon said shaft; a slack take-up spring for rotating said reel; a retriever spring for rotating said shaft; a member connected with a fixed part having an engagement in one of its positions with said shaft so as to prevent the movement thereof by said retriever spring; and a pivotally mounted trip member engaging said member and holding it out of engagement with said shaft.

20. In a combined trolley catcher and retriever, the combination with a casing; of a shaft rotatably mounted therein; a reel journaled upon said shaft; a slack take-up spring for rotating said reel; a retriever spring for rotating said shaft; a rock lever connected with a fixed part having engagement with said shaft for locking the same against rotation by said retriever spring; means for moving said rock lever out of engagement with said shaft; and means as a trip member pivotally mounted upon a fixed part, for holding said rock lever against movement when disengaged from said shaft.

21. In a combined trolley catcher and retriever, the combination with a casing; of a shaft rotatably mounted therein; a reel journaled upon said shaft; a slack take-up spring for rotating said reel; a retriever spring for rotating said shaft; a member connected with a fixed part having an engagement in one of its positions with said shaft so as to prevent the movement thereof by said retriever spring; means for holding said member out of engagement with said shaft; and means for releasing said member so that the same will again engage said shaft after a predetermined number of rotations thereof.

22. In a combined trolley catcher and retriever, the combination with a casing; of a shaft rotatably mounted therein; a reel journaled upon said shaft; a slack take-up spring for rotating said reel; a retriever spring for rotating said shaft; a member connected with a fixed part having an engagement in one of its positions with said shaft so as to prevent the movement thereof by said retriever spring; means for holding said member out of engagement with said shaft; means for releasing said member so that the same will again engage said shaft after a predetermined number of rotations thereof, comprising a locking element having an engagement with said member; and means operated by said shaft for releasing such engagement after the shaft has made a predetermined number of rotations.

23. In a combined trolley catcher and retriever, the combination with a casing; of a shaft rotatably mounted therein; a reel journaled upon said shaft; a slack take-up spring for rotating said reel; a retriever spring for rotating said shaft; a member connected with a fixed part having an engagement in one of its positions with said shaft so as to prevent the movement thereof by said retriever spring; means for holding said member out of engagement with said shaft; means for releasing said member so that the same will again engage said shaft after a predetermined number of rotations thereof, comprising a locking element having an engagement with said member; means operated by said shaft for releasing such engagement after the shaft has made a predetermined number of rotations, said means comprising a trip movable in the path of said locking element; and an operative connection between said trip and shaft, whereby said trip will move into the path of said locking element and actuate the same so as to release the shaft holding member at the completion of a predetermined number of revolutions of said shaft.

24. In a combined trolley catcher and retriever, the combination with a casing; of a shaft rotatably mounted therein; a spring for rotating said shaft; a reel mounted upon said shaft; means for separably connecting said reel with said shaft, whereby the same will move therewith as a unit; means including a cam, for actuating said means, whereby the same will have an operative engagement with said reel prior to the time said spring exerts its influence to rotate said shaft; and means, actuated by said cam, for positively holding the first of said means out of engagement with said reel.

25. In a combined trolley catcher and retriever, the combination with a casing; of a shaft rotatably mounted therein; a reel mounted upon said shaft; a slack take-up spring for moving said reel in one direction; a retriever spring for rotating the shaft in one direction; means for separably connecting said reel with said shaft, whereby the same will move therewith as a unit; means for holding said shaft against movement by said retriever spring; and means connected with said shaft for holding the said means for separably connecting the reel with said shaft out of engagement with said shaft while said shaft holding means is in engagement with said shaft.

26. In a combined trolley catcher and retriever, the combination with a casing; of a shaft rotatably mounted therein; a reel mounted upon said shaft; a spring for moving said reel; a retriever spring for moving said shaft; centrifugally actuated dogs connected with said shaft and movable in the path of parts upon said reel; means connected with a fixed part for holding said shaft against rotation; and means controlled by said latter means for holding said dogs out of engagement with said reel while said shaft holding means is in engagement with said shaft.

27. In a combined trolley catcher and retriever, the combination with a shaft rotatably mounted therein; a reel rotatably mounted upon said shaft; a retriever spring for rotating said shaft; locking means connected with a fixed part for holding said shaft against rotation; an arm connected with said shaft and movable in the path of said locking means; a stop for limiting the movement of said arm; and a shield closing the open space between said arm in its retracted position and said stop.

28. In a combined trolley catcher and retriever, the combination with a shaft rotatably mounted therein; a reel rotatably mounted upon said shaft; a retriever spring for rotating said shaft; locking means connected with a fixed part for holding said shaft against rotation; and an arm connected with said shaft and movable in the path of said locking means, said arm engaging said locking means prior to its engagement with said stop.

29. In a device of the character described, the combination with a casing, having a lug thereon; a reel rotatably mounted within said casing; a throwout dog connected with said reel; a member mounted within said casing, having a part thereon that engages said lug and in the path of said dog; and a spring for holding said member in contact with said dog when engaged by said dog.

In testimony whereof I affix my signature in presence of two witnesses.

CHARLES E. GIERDING.

Witnesses:
  GEORGE E. HALL,
  FLORENCE H. MONK.

Copies of this patent may be obtained for five cents each, by addressing the "Commissioner of Patents, Washington, D. C."